Dec. 25, 1962 W. G. BUESCHER 3,069,846
THRUST DEVICE
Filed Sept. 28, 1959 2 Sheets-Sheet 1

Dec. 25, 1962 W. G. BUESCHER 3,069,846
THRUST DEVICE
Filed Sept. 28, 1959 2 Sheets-Sheet 2

United States Patent Office 3,069,846
Patented Dec. 25, 1962

3,069,846
THRUST DEVICE
Wilbert G. Buescher, Alhambra, Calif., assignor to Clary Corporation, San Gabriel, Calif., a corporation of California
Filed Sept. 28, 1959, Ser. No. 842,752
5 Claims. (Cl. 60—35.6)

This invention relates to thrust devices such as are used to maneuver space vehicles, rockets, guided missiles, or the like.

Thrust devices of the above type are generally required to produce an adjustable thrust in response to a control device located either at a point adjacent the vehicle or at a point on the ground or elsewhere remote from the vehicle. Although such devices of this nature are particularly applicable to steering or controlling the direction of movement of a space craft, they could also be used as a primary or auxiliary propulsion system. In order to provide effective control of such thrust devices, it is desirable that the amplitude of thrust be adjustably controllable.

It therefore becomes a principal object of the present invention to provide a thrust device of the above type in which the amplitude of thrust is remotely controllable.

Another object is to provide a thrust device of the above type in which the amplitude of thrust is proportional to the amplitude of a control signal applied thereto.

Another object is to provide an adjustable thrust device utilizing a fluid under pressure to provide the thrust.

Another object is to provide a thrust device which is quickly responsive to a control signal.

Another object is to provide a thrust device of the above type which is simple, compact and economical to manufacture.

The manner in which the above and other objects of the invention are accomplished will be readily understood on reference to the following specification when read in conjunction with the accompanying drawings, wherein.

Figure 1:
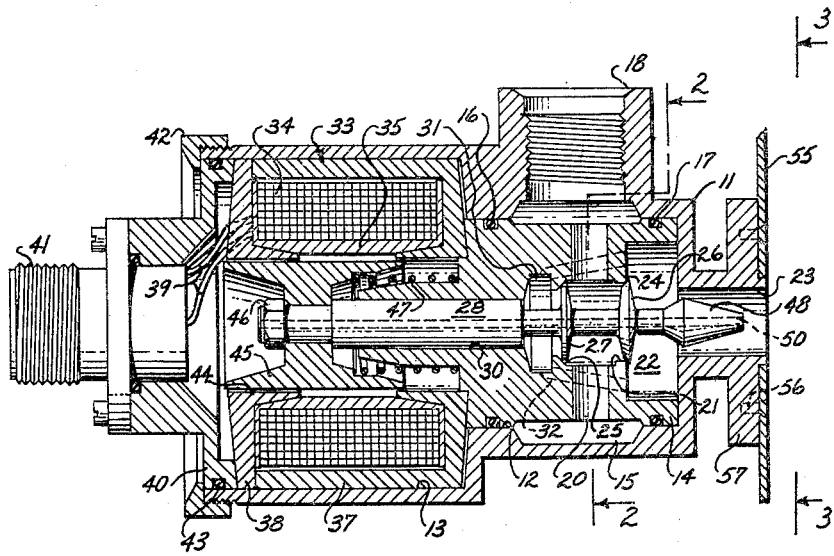
FIG. 1 is a longitudinal sectional view through a thrust device embodying a preferred form of the present invention.
Figure 2:
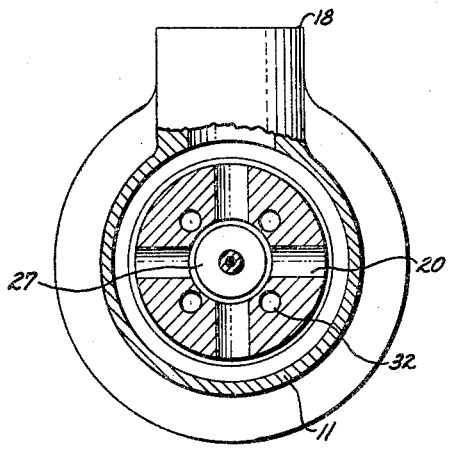
FIG. 2 is a transverse sectional view taken substantially along the line 2—2 of FIG. 1.

Referring to the drawings, the thrust device comprises a hollow body 11 having stepped cavities 12 and 13 formed therein. A valve chamber member 14 is fitted in the cavity 12, the body and member 14 being shaped to form an annular passage 15 therebetween. O-rings 16 and 17 are fitted in grooves formed in the member 14 on opposite ends of the passage 15 to prevent leakage of gas under pressure between the member 14 and the body. A coupling connection 18 is formed in the body and communicates with the passage 15 to convey gas under pressure into the passage.

Radially extending passages 20 are formed in the member 14 to communicate the passage 15 with the interior of an irregularly shaped bore or cavity 21 extending longitudinally through the member 14. The latter bore is enlarged to form a chamber 22 which communicates with an exhaust nozzle 23 formed at the right-hand end of the body 11. The bore 21 is formed with two annular shoulders 24 and 25 which form valve ports and which cooperate with poppet heads 26 and 27, respectively, integral with a slide or poppet 28. The latter has a shank portion slideably mounted in a bearing 30 formed in the left-hand end of the member 14.

A second chamber 31, somewhat smaller than the chamber 22, is formed in the bore 21 intermediate the annular seat 25 and the bearing 30. This chamber communicates through passages 32 with the chamber 22.

A solenoid generally indicated at 33 is mounted in the cavity 13 of the body for actuating the poppet 28 from its illustrated closed position to an open position. The solenoid comprises a coil 34 wound on a bobbin 35 of non-magnetic material which is fitted between flux case parts 37 and 38 formed of iron or similar magnetic material. The case part 37 is fitted in the cavity 13 and abuts the valve chamber member 14 to retain the latter in place. The case part 38 is also fitted in the cavity 13 and abuts a flanged portion of the part 37 to form a flux path around a major portion of the coil.

A cap member 40 carrying an electrical connector element 41 is fitted in the cavity 13 and is held against the case part 38 by a nut 42 threadably secured on the body. Appropriate terminals (not shown) in the connector element 41 are connected to conductor leads 39 for the solenoid coil 34. An O-ring 43 is fitted within a groove formed in the outer periphery of the cap member to prevent leakage of gas at this point.

Inwardly extending flanges 44 on the case parts 37 and 38 cooperate with an armature 45, also of magnetic material, which armature is attached to the poppet member 28 by a nut 46.

A light compression spring 47 is compressed between the member 14 and the armature 45 to normally hold or bias the poppet in its closed condition illustrated in FIG. 1 wherein the poppet heads 26 and 27 seat against the respective seats 24 and 25.

It will be noted that the circles of contact of the poppet heads 26 and 27 are substantially of the same diameter so that a substantially balanced condition exists whereby pressure of the compressed gas against the heads will have no affect on the poppet member 28 in any position thereof. This arrangement enables the light spring 47 to hold the poppet in closed position regardless of the amount of pressure exerted by the compressed gas.

An enlarged head 48 is formed on the poppet and extends into the nozzle 23. The head 48 is conical in shape having a tip of smaller diameter than its base. This construction forms an expansion type nozzle whereby to expel the gas passing from the valve chamber formed by the seats 24 and 25, etc., through the nozzle at a relatively high velocity. At the same time, the gas upon passing through the nozzle reacts against the head 48, urging the poppet toward its closed condition with a force substantially proportional to the amount of thrust developed by the gas as it emerges from the nozzle.

Normally, the light spring 47 will hold the valve in its illustrated position wherein no thrust is developed. However, as voltage is applied to the coil 34, the magnetic flux developed in the flux case parts 37 and 38 will attract the armature 45 to the right causing the poppet to open the valve ports 24 and 25. The gas, passing through the radial passages 20 and the portion of the bore 21 intermediate the valve ports 24 and 25, will divide through the two ports and will pass into the chambers 22 and 31. Thereupon, the gas will reunite in the chamber 22 and will be expelled out of the nozzle to develop a thrust and consequent reaction against the poppet, the amplitude to the thrust being dependent upon the opening of the poppet. As the voltage level is increased the poppet is opened to a greater extent, resulting in a greater thrust and, hence, a greater reaction against the poppet. Thus, as greater thrust is developed proportionately greater levels of voltage are required to increase such thrust.

It will be noted, that within certain limits, the thrust developed is substantially independent of the pressure of the gas conveyed into the valve chamber. Also, by changing the size and shape of the poppet head 48 and other component parts, the relationship between the amplitude of thrust and voltage levels required may be varied as desired. However, by using substantially the proportions shown in the drawings, the ratio between the amplitude of thrust and voltage levels required to energize the coil approaches a straight line relation.

It will be noted that change in voltage levels can be readily applied to the coil either directly or from a remote location through well known remote control apparatus. Thus, the device of the present invention readily adapts itself to use in connection with guided missiles and other space craft wherein control is effected from the ground.

In order to vent the interior of the solenoid and to accommodate for movement of the armature 45 and poppet an axial passage 50 is formed throughout the length of the poppet.

Figure 4:
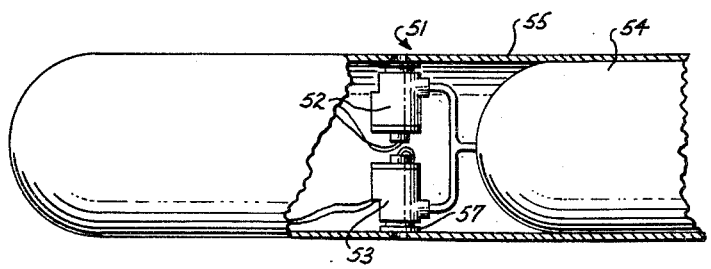
FIG. 4 is a side view, partly in section and partly broken away, of a space craft two thrust devices constructed in accordance with the present invention.

FIG. 4 illustrates a space craft, generally indicated at 51, wherein two thrust devices 52 and 53, of the construction shown in FIG. 1, are mounted. Also, mounted in the craft is tank 54 containing a gas under pressure.

Figure 3:
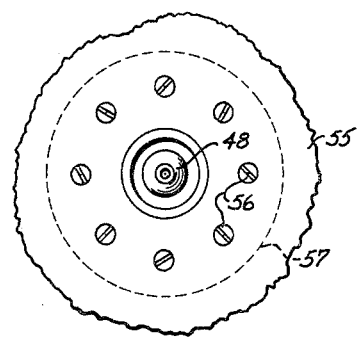
FIG. 3 is a fragmentary front view of the thrust device and is taken substantially along the line 3—3 of FIG. 1.

The thrust devices 52 and 53 are each provided with a flange 57 which is suitably attached as by screws 56 (FIGS. 1 and 3) to the shell 55 of the craft, openings being provided in the shell in line with the exhaust nozzles of the thrust devices to permit expulsion of gas outwardly in either of opposite directions whereby to control the position or direction of movement of the craft.

Although I have described my invention in detail and have therefore utilized certain terms and languages herein it is to be understood that the present disclosure is illustrative rather than restrictive and that changes and modifications may be resorted to without departing from the spirit or scope of the claims appended hereto.

Having thus described the invention what I desire to secure by United States Letters Patent is:

1. A fluid thrust device comprising a body having a cavity therein terminating at its rear end in an exhaust nozzle and being closed at its forward end, means in said body forming a first annular valve seat extending in said cavity, means in said body forming a second annular valve seat extending in said cavity and located between said first valve seat and said nozzle, said second valve seat being spaced from said nozzle to form a first chamber, a slide member slideable in said cavity, a pair of closure members on said slide member cooperable with respective ones of said valve seats and effective to seat against the downstream sides of said valve seats, said cavity forming a second chamber on the side of said first seat remote from said second seat, means forming a fluid communication between said chambers, a source of fluid communicating with said bore intermediate said valve seats, a head on said slide member extending into said nozzle, said head decreasing in cross sectional area toward the end thereof opposite said slide member, said head being responsive to reaction forces developed by said fluid passing through said nozzle to move said slide member to close said valve seats, said slide member having a fluid vent passage extending lengthwise therethrough whereby to vent said forward end of said cavity, and yieldable means for moving said slide member to open said valve seats.

2. A fluid thrust device comprising a body having a cavity therein terminating at its rear end in an exhaust nozzle and being closed at its forward end, means in said body forming a first annular valve seat extending in said cavity, means in said body forming a second annular valve seat extending in said cavity and located between said first valve seat and said nozzle, said second valve seat being spaced from said nozzle to form a first chamber, said cavity forming a bearing on a side of said first valve seat remote from said second valve seat, a valve member slideable in said bearing, a pair of closure members on said valve member cooperable with respective ones of said valve seats and effective to seat against the downstream sides of said valve seats, said cavity forming a second chamber intermediate said bearing and said first valve seat, means forming a fluid communication between said chambers, a source of fluid communicating with said cavity intermediate said valve seats, a head on the rear end of said valve member extending through said first chamber and responsive to reaction forces developed by said fluid passing through said nozzle to move said slide member to close said valve seats, said head decreasing in cross sectional area toward the end thereof opposite said valve member, said valve member having a fluid vent passage extending lengthwise therethrough and terminating at the portion of said head having the least cross sectional area, and electromagnetic means on the side of said bearing remote from said second chamber for moving said valve member to open said valve seats.

3. A fluid thrust device comprising a body having a cavity therein terminating at its rear end in an exhaust nozzle and being closed at its forward end, means in said body forming a first annular valve seat extending in said cavity, means in said body forming a second annular valve seat extending in said cavity and located between said first valve seat and said nozzle, said second valve seat being spaced from said nozzle to form a first chamber, said cavity having a bearing on the side of said first valve seat remote from said second valve seat, a slide member slideable in said bearing, a pair of closure members on said slide member cooperable with respective ones of said valve seats and effective to seat against the downstream sides of said valve seats, said cavity forming a second chamber intermediate said bearing and said first valve seat, means forming a fluid communication between said chambers, a source of fluid communicating with said cavity intermediate said valve seats, a head on the rear end of said slide member extending into said nozzle, said head being responsive to reaction forces developed by said fluid passing through said nozzle to move said slide member to close said valve seats, said head and said nozzle cooperating to form an exhaust opening which increases in cross sectional area toward the end of said nozzle remote from said first chamber, a magnetic armature on said slide member on the side of said bearing remote from said second chamber, said slide member having a fluid vent passage extending lengthwise therethrough to communicate said forward end of said cavity to the interior of said nozzle, and an electromagnetic coil carried by said body adjacent said forward end of said cavity and cooperable with said armature whereby to move said slide member to open said valve seats.

4. A fluid thrust device comprising a first body having a cavity therein terminating in an exhaust nozzle, a valve chamber member in said cavity, said chamber member having a second cavity therein terminating adjacent its rear end in a first chamber communicating with said nozzle and being closed at its forward end, means in said chamber member forming a first annular valve seat extending in said second cavity, means in said chamber member forming a second annular valve seat extending in said second cavity between said first valve seat and said first chamber, a slide member slidable in said second cavity, a pair of closure members on said slide member cooperable with respective ones of said valve seats and effective to seat against the downstream sides of said valve seats, said second cavity forming a second chamber on the side of said first valve seat remote from said second seat, means forming a fluid communication between said chambers, a source of fluid communicating with said second cavity intermediate said valve seats, a head on the rear end of said slide member extending into said nozzle, said head being responsive to reaction forces developed by said fluid passing through said nozzle to move said slide member to close said valve seats, said head and said nozzle cooperating to form an exhaust opening which increases in cross sectional area toward the end of said nozzle remote from said first chamber, said slide member having a fluid vent passage extending lengthwise therethrough to communicate said forward end of said cavity with the interior of said nozzle, a magnetic armature on said slide member, and electromagnetic means in said first cavity, said electromagnetic means cooperating with said armature whereby to move said slide member to open said valve seats.

5. A fluid thrust device comprising a body having a first cavity therein terminating in an exhaust nozzle, a valve chamber member in said cavity, said chamber member having a second cavity therein terminating adjacent to rear end in a first chamber communicating with said nozzle and being closed at its forward end, means in said chamber member forming a first annular valve seat extending in said second cavity, means in said chamber member forming a second annular valve seat extending in said second cavity between said first valve seat and said first chamber, said second cavity forming a bearing on the side of said first seat remote from said second seat, a slide member slideable in said bearing, a pair of closure members on said slide member cooperable with respective ones of said valve seats and effective to seat against the downstream sides of said valve seats, said second cavity forming a second chamber intermediate said bearing and said first valve seat, means forming a fluid communication between said chambers, a source of fluid communicating with said second cavity intermediate said valve seats, a head on said slide member extending through said first chamber and responsive to reaction forces developed by said fluid passing through said nozzle, said head and said nozzle cooperating to form an exhaust opening which increases in cross sectional area toward the end of said nozzle remote from said first chamber, said slide member having a fluid vent passage extending lengthwise therethrough to communicate said forward end of said cavity to the interior of said nozzle, a magnetic armature on said slide member and located on the side of said bearing remote from said second chamber, and electromagnetic means in said first cavity, said electromagnetic means being cooperable with said armature whereby to move said slide member to open said valve seats.

References Cited in the file of this patent

UNITED STATES PATENTS

| | | |
|---|---|---|
| 2,243,781 | Thornhill | May 27, 1941 |
| 2,549,786 | Drake | Apr. 24, 1951 |
| 2,570,629 | Anxionnaz | Oct. 9, 1951 |
| 2,714,803 | Abild | Aug. 9, 1955 |
| 2,854,023 | Heyer | Sept. 30, 1958 |

FOREIGN PATENTS

| | | |
|---|---|---|
| 596,714 | Germany | Dec. 25, 1929 |
| 610,143 | Great Britain | Oct. 12, 1948 |
| 758,785 | Great Britain | Oct. 10, 1956 |